(12) United States Patent
Supowitz et al.

(10) Patent No.: US 10,486,760 B1
(45) Date of Patent: Nov. 26, 2019

(54) SEAT WITH DOWNWARDLY-SLANTED BUMP-LESS NOSE

(71) Applicant: AB Inventions, LLC, Marina Del Ray, CA (US)

(72) Inventors: Ani Supowitz, Marina Del Ray, CA (US); Bryan Visintin, Marina Del Ray, CA (US); Ian Fettes, June Lake, CA (US)

(73) Assignee: AB Inventions, LLC, Marina Del Rey, CA (US)

( * ) Notice: Subject to any disclaimer, the term of this patent is extended or adjusted under 35 U.S.C. 154(b) by 0 days.

(21) Appl. No.: 16/373,557

(22) Filed: Apr. 2, 2019

Related U.S. Application Data

(63) Continuation-in-part of application No. 29/676,776, filed on Jan. 14, 2019, and a continuation-in-part of application No. 29/663,912, filed on Sep. 20, 2018.

(60) Provisional application No. 62/733,645, filed on Sep. 20, 2018.

(51) Int. Cl.
| | |
|---|---|
| *B62J 1/00* | (2006.01) |
| *B62J 1/18* | (2006.01) |
| *B62J 1/08* | (2006.01) |
| *B62J 1/04* | (2006.01) |

(52) U.S. Cl.
CPC .............. *B62J 1/007* (2013.01); *B62J 1/04* (2013.01); *B62J 1/08* (2013.01); *B62J 1/18* (2013.01)

(58) Field of Classification Search
None
See application file for complete search history.

(56) References Cited

U.S. PATENT DOCUMENTS

| | | | | | |
|---|---|---|---|---|---|
| 3,604,748 | A | * | 9/1971 | Lamkemeyer | B62J 1/18 297/214 |
| 3,712,670 | A | * | 1/1973 | Svehla | B62J 1/00 297/214 |
| 4,108,462 | A | * | 8/1978 | Martin | B62J 1/00 248/286.1 |
| 4,580,643 | A | | 4/1986 | Fox et al. | |
| 4,850,643 | A | | 7/1989 | Rollman | |
| 5,074,618 | A | * | 12/1991 | Ballard | B62J 1/00 297/199 |
| 5,108,076 | A | * | 4/1992 | Chiarella | B62J 1/18 297/214 |

(Continued)

FOREIGN PATENT DOCUMENTS

| | | |
|---|---|---|
| BE | 1019880 A4 | 2/2013 |
| CN | 1278419 A | 1/2001 |

(Continued)

OTHER PUBLICATIONS

Website print, "Nexride Pro Noseless Saddle," 6 pages, http://www.nexride.com/nexride-pro.html.

*Primary Examiner* — David E Allred
(74) *Attorney, Agent, or Firm* — Larry K. Roberts

(57) ABSTRACT

A seat structure includes a substrate structure and a pad structure affixed to a top surface of the substrate structure. The seat structure has a support region configured to provide a support for a user's buttocks, and a downwardly sloped nose portion. The seat structure is bump-less in that there is no raised portion at an area between the user's legs which would extend upwardly from adjacent laterally outward portions.

16 Claims, 15 Drawing Sheets

(56) References Cited

U.S. PATENT DOCUMENTS

| | | | |
|---|---|---|---|
| 5,203,607 A * | 4/1993 | Landi | B62J 1/26 297/214 |
| 5,356,205 A * | 10/1994 | Calvert | B62J 1/002 280/288.4 |
| 5,363,094 A | 11/1994 | Staron et al. | |
| 5,419,612 A * | 5/1995 | Rassekhi | B62J 1/26 297/200 |
| 5,645,315 A | 7/1997 | Walker et al. | |
| 5,904,396 A * | 5/1999 | Yates | B62J 1/002 297/195.1 |
| 5,921,625 A * | 7/1999 | Muser | B62J 1/00 297/215.13 |
| 5,938,278 A | 8/1999 | Langevin | |
| 6,019,423 A * | 2/2000 | Dodge | B62J 1/002 297/195.1 |
| 6,039,396 A * | 3/2000 | Muser | B62J 1/18 297/195.1 |
| 6,045,180 A | 4/2000 | Clutton | |
| 6,068,333 A * | 5/2000 | Dixon | B62J 1/002 297/195.13 |
| 6,079,775 A | 6/2000 | Lawson | |
| 6,116,683 A * | 9/2000 | Maier | B62J 1/08 297/195.1 |
| 6,139,098 A | 10/2000 | Carrillo | |
| 6,158,806 A | 12/2000 | White | |
| 6,193,309 B1 * | 2/2001 | Gootter | B62J 1/002 297/202 |
| 6,209,954 B1 | 4/2001 | Bombardier | |
| 6,471,291 B1 * | 10/2002 | Dodge | B62J 1/007 297/209 |
| 6,554,355 B2 | 4/2003 | Kaptur | |
| 6,783,176 B2 | 8/2004 | Ladson, III | |
| 6,786,542 B1 | 9/2004 | Nuzzarello | |
| 7,004,540 B2 | 2/2006 | Catling | |
| 7,044,542 B2 | 5/2006 | Muscat | |
| 7,537,281 B2 | 5/2009 | Riondato | |
| 7,963,613 B2 * | 6/2011 | Felmeri | A47K 3/282 24/289 |
| 8,567,806 B2 | 10/2013 | Yuan | |
| 8,668,259 B2 | 3/2014 | Ulrich | |
| 8,944,501 B2 | 2/2015 | Tseng | |
| 8,998,314 B2 | 4/2015 | Eldredge | |
| 9,039,082 B2 | 5/2015 | Truglio | |
| 9,056,642 B2 | 6/2015 | Onyeka | |
| 9,102,377 B2 | 8/2015 | Reeb | |
| 9,205,888 B1 | 12/2015 | Watts et al. | |
| 9,211,927 B1 | 12/2015 | Dick | |
| 9,242,689 B2 | 1/2016 | Yeh | |
| 9,321,496 B2 | 5/2016 | Curless | |
| 9,663,166 B2 | 5/2017 | Hamel | |
| 9,821,867 B2 | 11/2017 | Goff | |
| 10,093,370 B2 | 10/2018 | Ogawa et al. | |
| 2002/0185897 A1 | 12/2002 | Crutch | |
| 2004/0140698 A1 | 7/2004 | Urban | |
| 2005/0104423 A1 * | 5/2005 | Yu | B62J 1/00 297/214 |
| 2005/0212337 A1 | 9/2005 | Lee | |
| 2007/0069557 A1 | 3/2007 | Toll | |
| 2007/0102970 A1 | 5/2007 | Wallace | |
| 2007/0262623 A1 * | 11/2007 | Fortt | B62J 1/04 297/215.13 |
| 2008/0093898 A1 * | 4/2008 | Chiang | B62J 1/007 297/214 |
| 2008/0169689 A1 | 7/2008 | Chien-Kuo | |
| 2011/0018315 A1 | 1/2011 | DeRoy | |
| 2013/0147151 A1 | 6/2013 | Noble | |
| 2015/0097401 A1 * | 4/2015 | Toll | B62J 1/007 297/214 |
| 2015/0272340 A1 * | 10/2015 | Hopp | B62J 1/26 137/223 |
| 2016/0068212 A1 | 3/2016 | Hamel | |
| 2016/0167726 A1 | 6/2016 | Dudley | |
| 2017/0233020 A1 * | 8/2017 | Goff | B62J 1/005 297/201 |
| 2017/0355409 A1 | 12/2017 | Deiana | |
| 2018/0244332 A1 * | 8/2018 | Krause | B62J 1/00 |
| 2019/0047648 A1 | 2/2019 | Bowker | |

FOREIGN PATENT DOCUMENTS

| | | | |
|---|---|---|---|
| DE | 102013004248 A1 | 2/2014 | |
| DE | 102013013770 B4 | 3/2017 | |
| EP | 0091016 A2 | 10/1983 | |
| EP | 1145944 A1 | 10/2001 | |
| EP | 1813515 A1 | 4/2009 | |
| EP | 3392127 A1 | 10/2018 | |
| GB | 575322 A * | 2/1946 | B62J 1/02 |
| GB | 2093779 A * | 9/1982 | B62J 1/02 |
| JP | 3195343 U | 1/2015 | |
| KR | 200167275 Y1 | 2/2000 | |
| KR | 200175436 Y1 | 3/2000 | |
| KR | 20110004701 U | 5/2011 | |
| KR | 101080740 B1 | 11/2011 | |
| KR | 101518208 B1 | 5/2015 | |
| KR | 101723509 B1 | 4/2017 | |
| WO | WO1995025662 A1 | 9/1995 | |
| WO | WO1996005998 A1 | 2/1996 | |
| WO | WO2009040861 A1 | 4/2009 | |
| WO | WO2012042204 A1 | 4/2012 | |
| WO | WO2013134253 A1 | 9/2013 | |
| WO | WO2016124163 A1 | 8/2016 | |

* cited by examiner

SEAT WITH DOWNWARDLY-SLANTED BUMP-LESS NOSE

CROSS-REFERENCE TO RELATED APPLICATION

This application claims priority of U.S. Provisional Application No. 62/733,645 filed Sep. 20, 2018, the entire contents of which are incorporated by this reference. This application also claims priority to U.S. application Ser. No. 29/676,776, filed Jan. 14, 2019, and to U.S. application Ser. No. 29/663,912, filed Sep. 20, 2018, the entire contents of which applications are incorporated herein by this reference.

BACKGROUND

Five hundred year ago, the bicycle was first envisioned by Leonardo da Vinci in his Codex Atlanticus, a twelve-volume, bound set of drawings and writings. Since then, Leonardo's vision of a bicycle, including the saddle, is almost identical to what exists today with bike seats. The focus of development of saddles has been weight and aesthetics rather than shape. These conventional bicycle saddles are shaped like a pear and include a posterior component and an anterior component. The posterior, wider, component supports the rider's buttocks. The anterior, narrower, portion commonly includes a forward extending portion, or "nose," shaped to fit between a rider's legs. The rider using a conventional saddle engages the crotch area of the body in load bearing relationship with the nose and thus transmits shock and pressure to the non-structural fleshy genital region. Riders at all levels have struggled with chafing, blistering, bruising, pain, numbness, and general discomfort. Growing scientific evidence points to the permanent damage to the nerves and blood vessels that supply the pelvic region of the body as the cause of impotence and sexual dysfunction with bicycle riders.

The saddle discomfort, also known to manufacturers, has been an undeniable problem for millions of riders and a major reason why millions choose exercise forms other than cycling. Sales of shorts with extra padding, however aesthetically displeasing, have increased as a response to address the discomfort. Riders typically alternate between cruising, racing, and stand up riding positions. Whereas there is contact with the saddle in the cruising and racing modes, the rider wants to avoid any saddle contact in the stand up pedaling mode. In the cruising position the rider wishes to sit comfortably distributing the weight equally on the sit bones, ischial tuberosities, and to cycle without obstruction. In the racing position, the rider seeks to gain speed in an aerodynamic, dropped down position, with the rider's genitals in a load bearing position against the nose of the saddle.

Stationary bikes have not been a focus for saddle development even though they are all manufactured with conventional saddles. Unequivocally, discomfort will also be a factor with stationary bikes as interest and participation increase in cycling fitness classes and equipment purchases.

BRIEF DESCRIPTION OF THE DRAWINGS

Features and advantages of the disclosure will readily be appreciated by persons skilled in the art from the following detailed description when read in conjunction with the drawing wherein.

DETAILED DESCRIPTION

Figure 1:
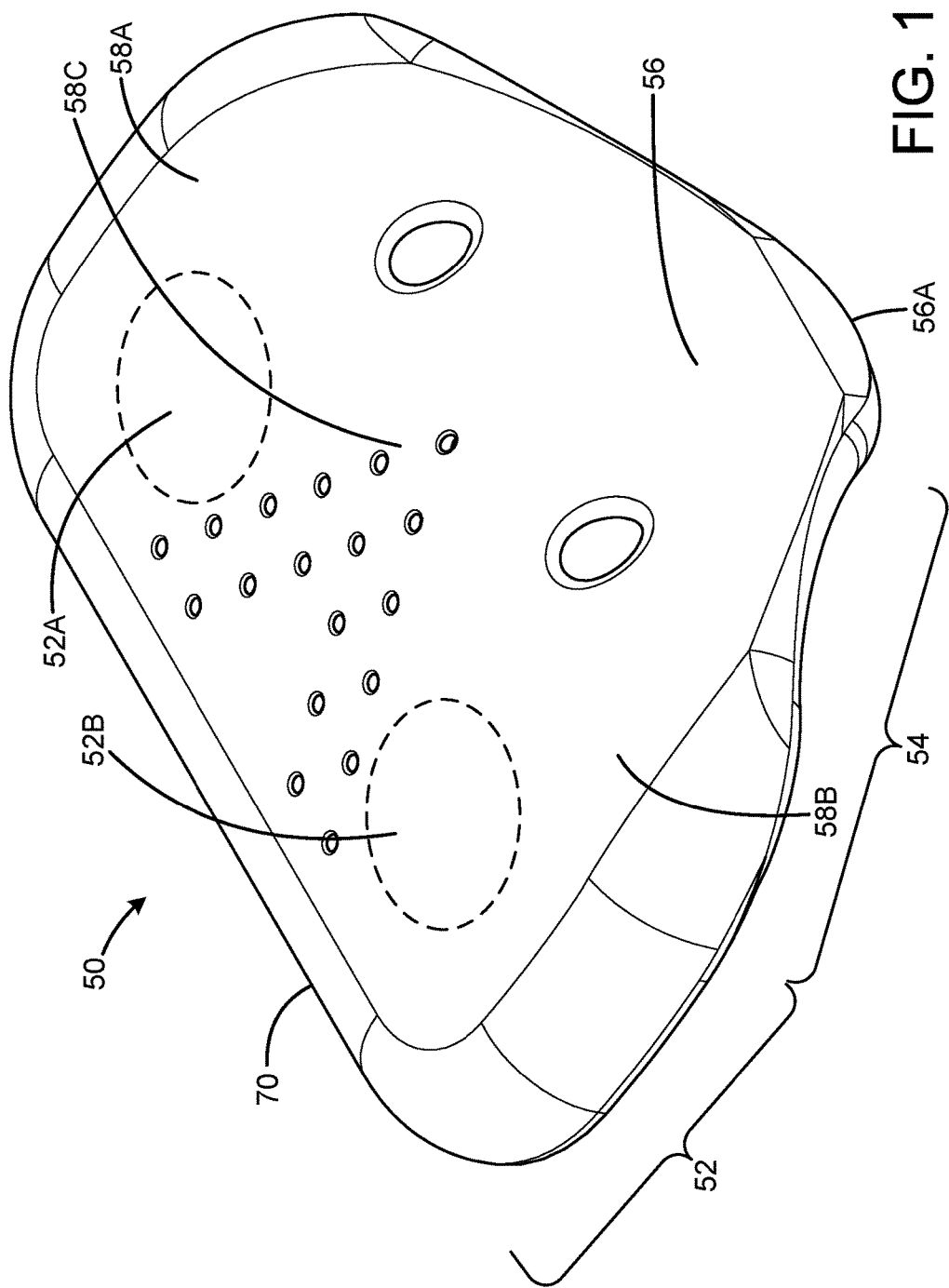
FIG. 1 is an isometric view of an exemplary embodiment of a seat structure in accordance with aspects of this invention, taken above and from the side of the structure.
Figure 2:
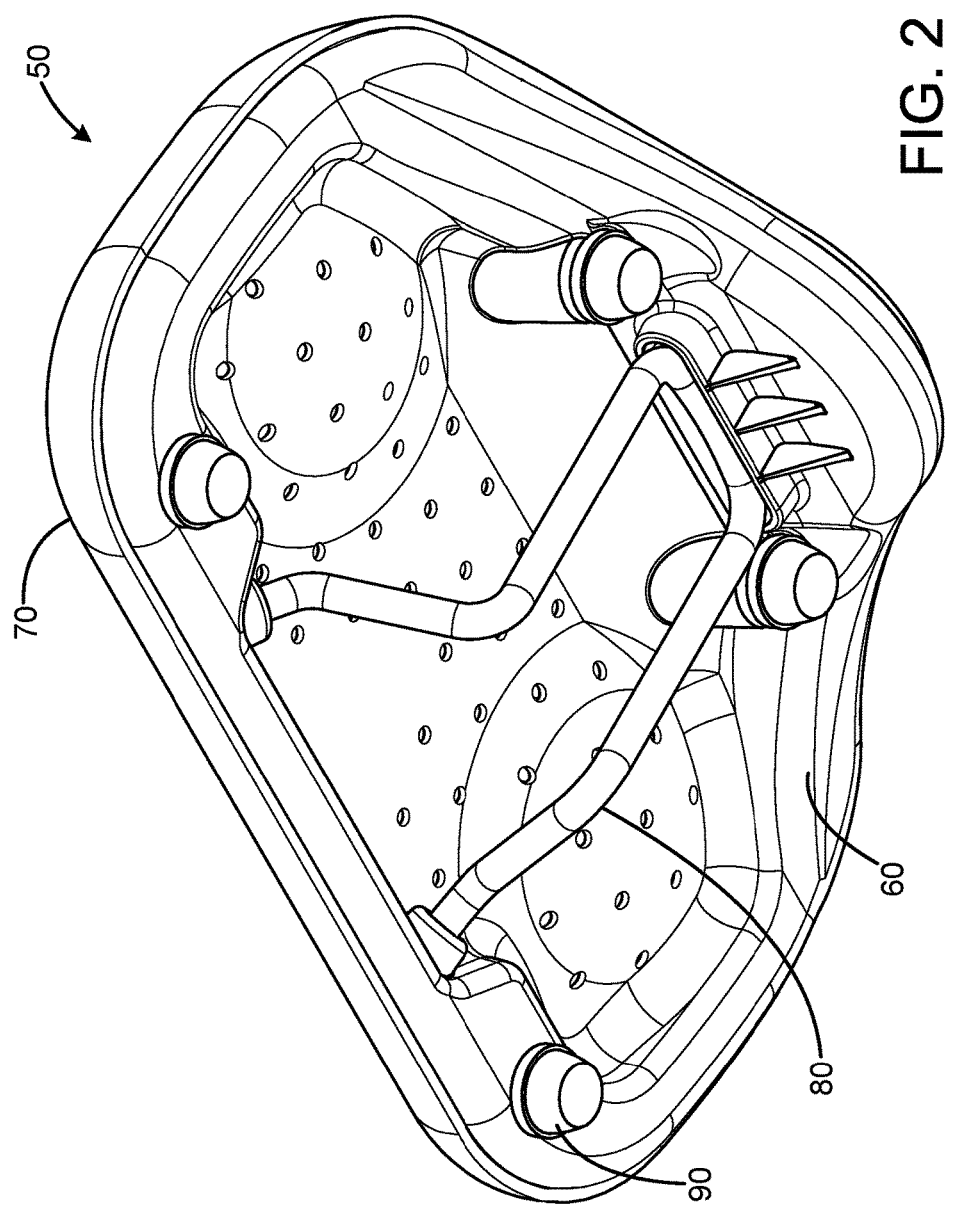
FIG. 2 is another isometric view of the seat structure of FIG. 1, taken below and to the side of the structure.
Figure 3:
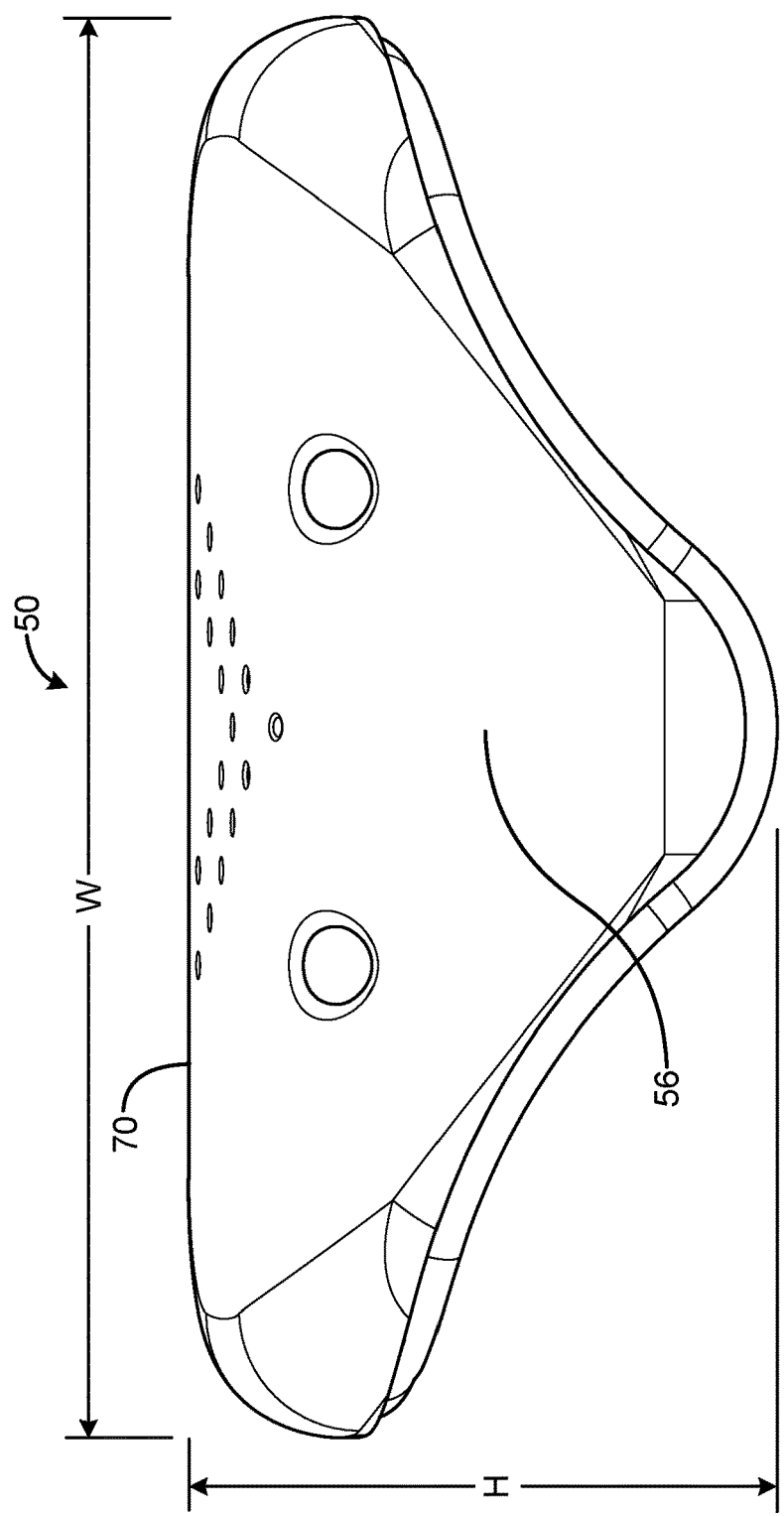
FIG. 3 is a front view of the seat structure of FIG. 1.
Figure 4:
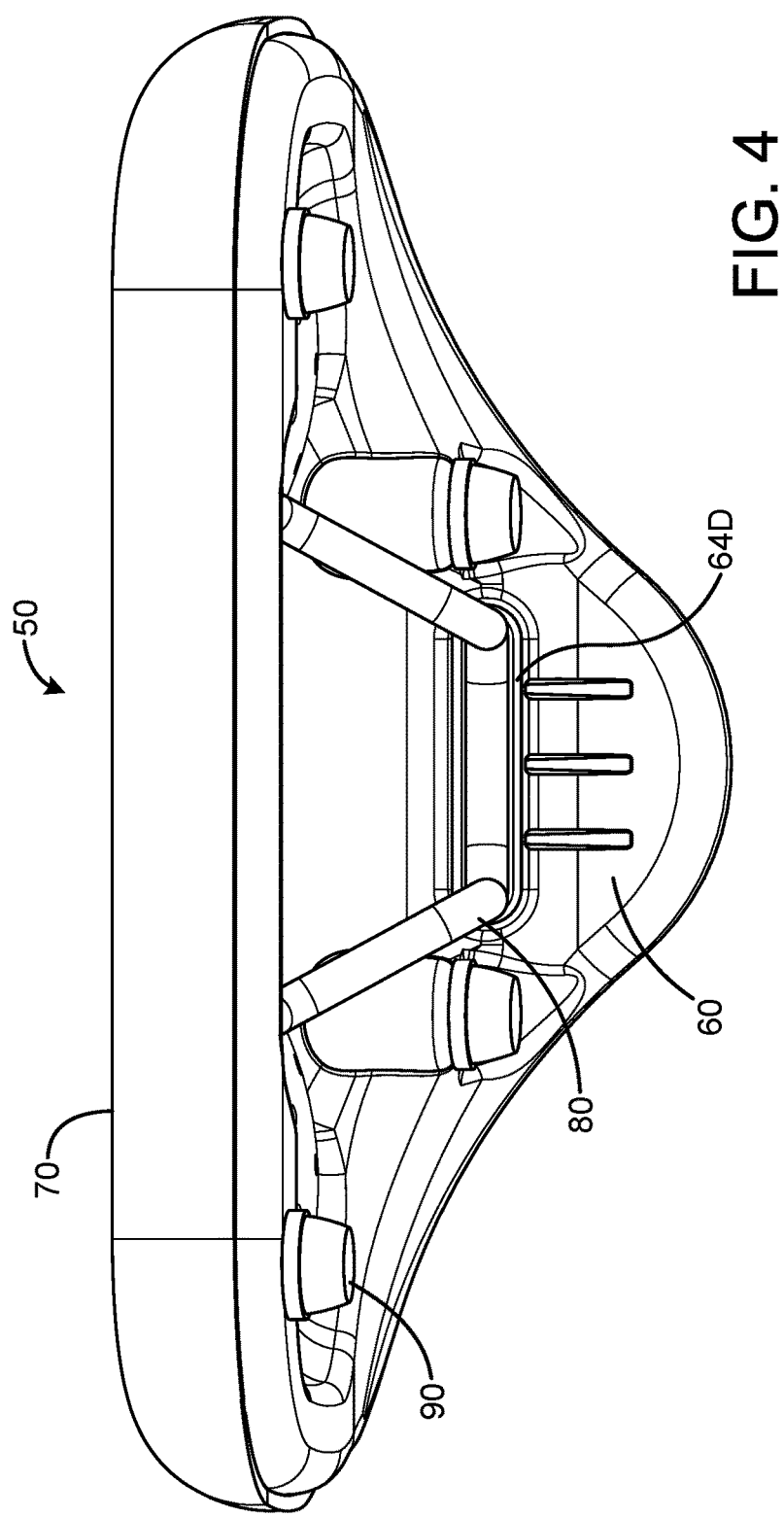
FIG. 4 is a rear view of the seat structure of FIG. 1.
Figure 5:
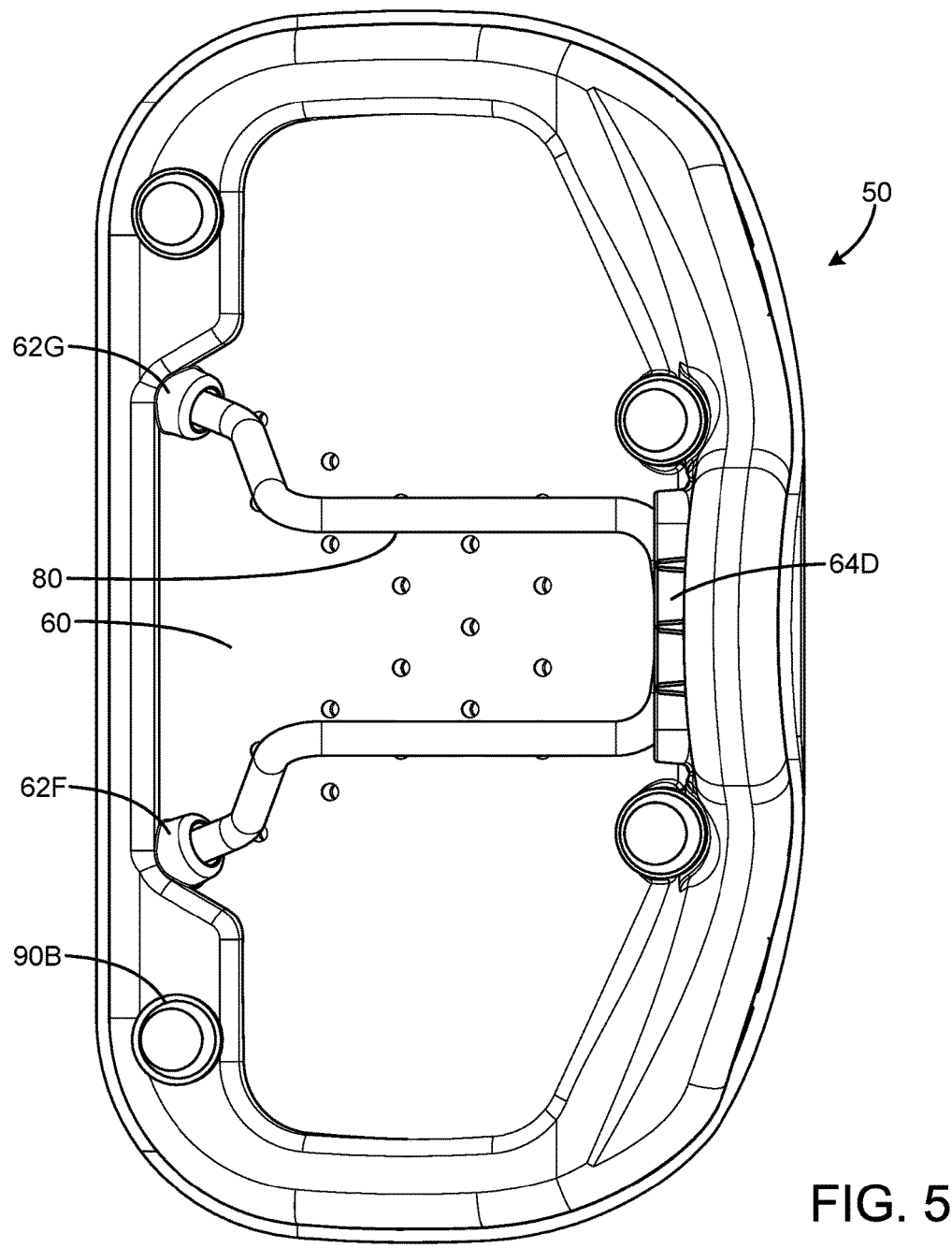
FIG. 5 is a bottom view of the seat structure of FIG. 1.
Figure 6:
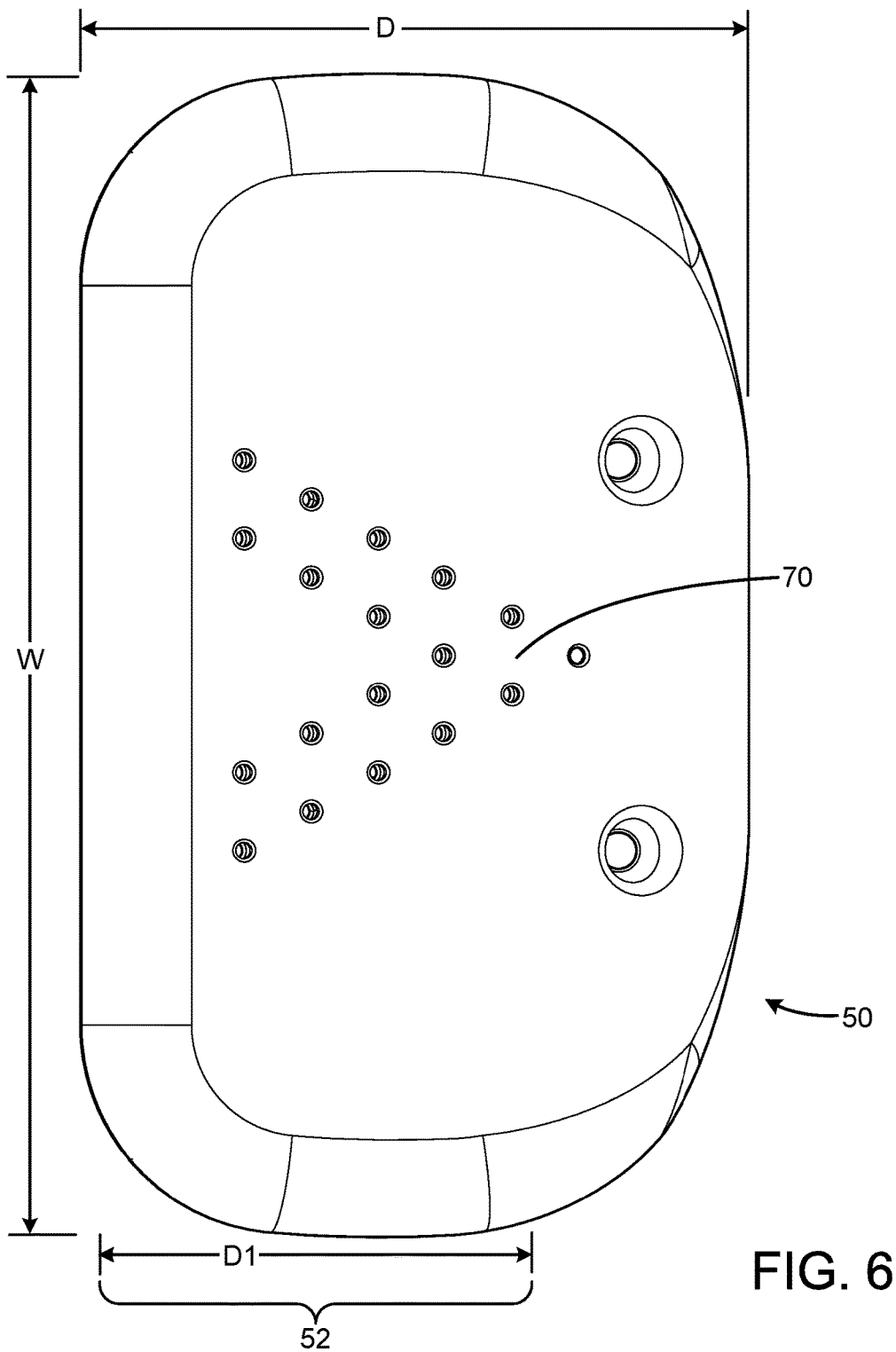
FIG. 6 is a top view of the seat structure of FIG. 1.

In the following detailed description and in the several figures of the drawing, like elements are identified with like reference numerals.

Embodiments of the present invention are directed to a seat structure which includes a downward slanting and bump-less nose. Exemplary embodiments may be used for recreational or fitness equipment particularly in pedal-operated devices such as a bicycle, or stationary bike. Exemplary embodiments may be made for use by all genders. Embodiments may also be configured for use in office chairs with knee/shin support, or in other seating applications.

When attached to a cycling device, embodiments of the seat structure provide comfort and continuous support as the cyclist shifts through riding modes. The downward slanted bump-less nose eliminates contact and pressure to the perineum and genitals. A cyclist using a seat structure according to aspects of this invention will be comfortable and in control in the seated cruising position due to equal engagement of the ischial tuberosities. In the angled racing mode, the rider will not slip and will stay in control due to constant and evenly distributed contact with the ischial tuberosities and the seat. The rider may be comfortable due to no pressure on the perineum or genitals and may perform optimally due to lack of interference of the seat with the user's thighs while pedaling. In the stand-up pedaling mode, the rider will have clearance from the seat and operating mobility.

FIGS. 1-7 illustrate an exemplary embodiment of a seat structure 50 in accordance with aspects of the invention. The seat structure includes a rigid substrate 60, a resilient pad structure 70 affixed to the top surface of the substrate, and an attachment structure 80 for attaching the seat structure to a bracket and seat post (not shown). The pad structure in this embodiment is fabricated of a resilient material such as TPU (thermo-plastic urethane) or foam. The pad is affixed to the top surface of the substrate by post portions extending through openings in the substrate and held in place by fasteners 90. Other attachment techniques may alternatively be used, such as adhesive, or a co-molding fabrication process, wherein the pad is molded directly onto the top surface of the substrate.

The seat structure 50 provides a support region generally indicated at 52 (FIG. 1) which provides a support for the user's buttocks. As will be described in further detail, the support region includes two areas 52A, 52B defined by the position of the user's sit bones for most users. In an exemplary embodiment, the areas 52A, 52B have different densities (softer) than other parts of the seat and distribute the weight across the ischial tuberosities. In other embodiments, the pad may be of uniform density. In other embodiments, the pad structure may have a uniform hardness or softness across the lateral extent of the region 52.

Figure 7:
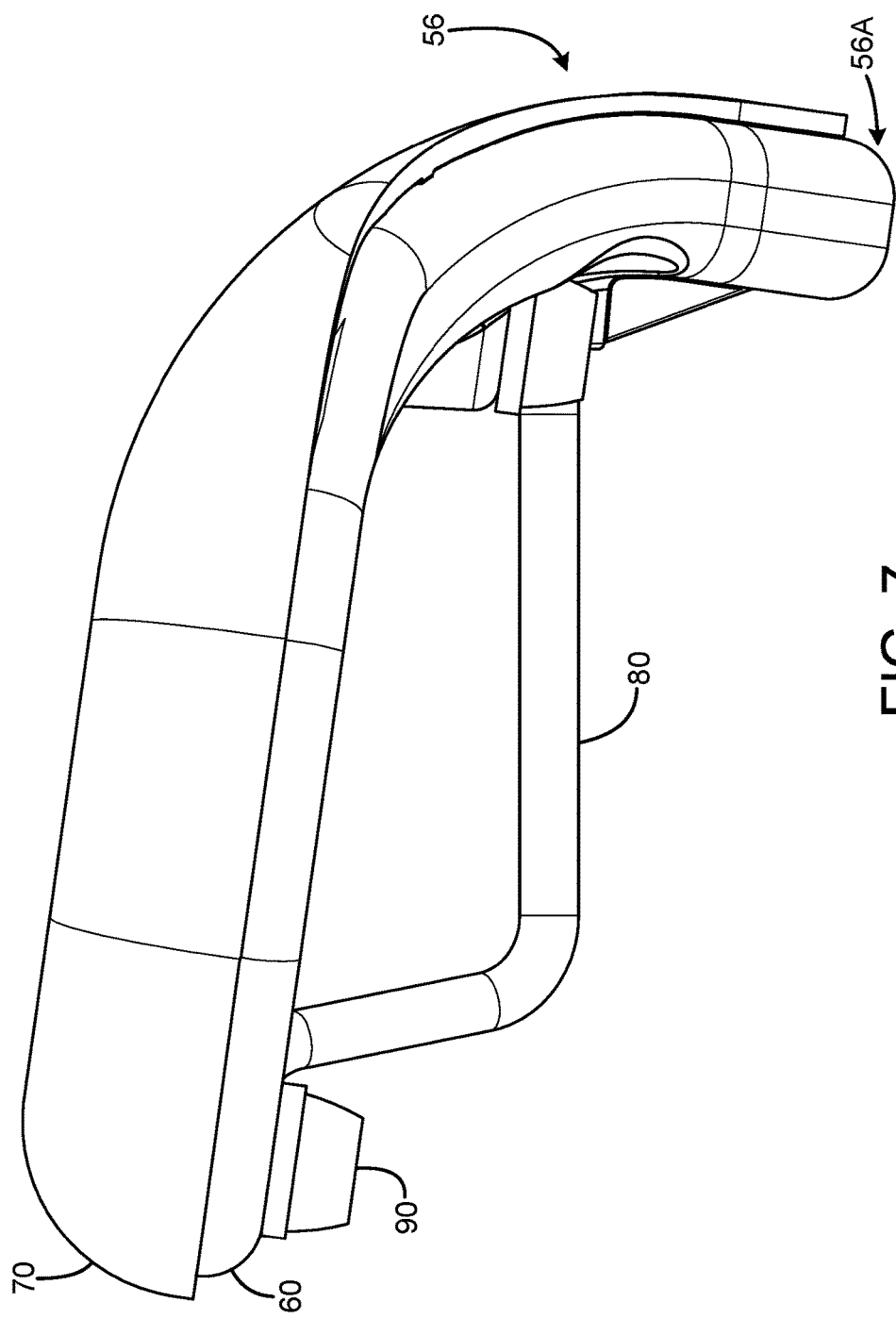
FIG. 7 is a left side view of the seat structure of FIG. 1.
Figure 8:
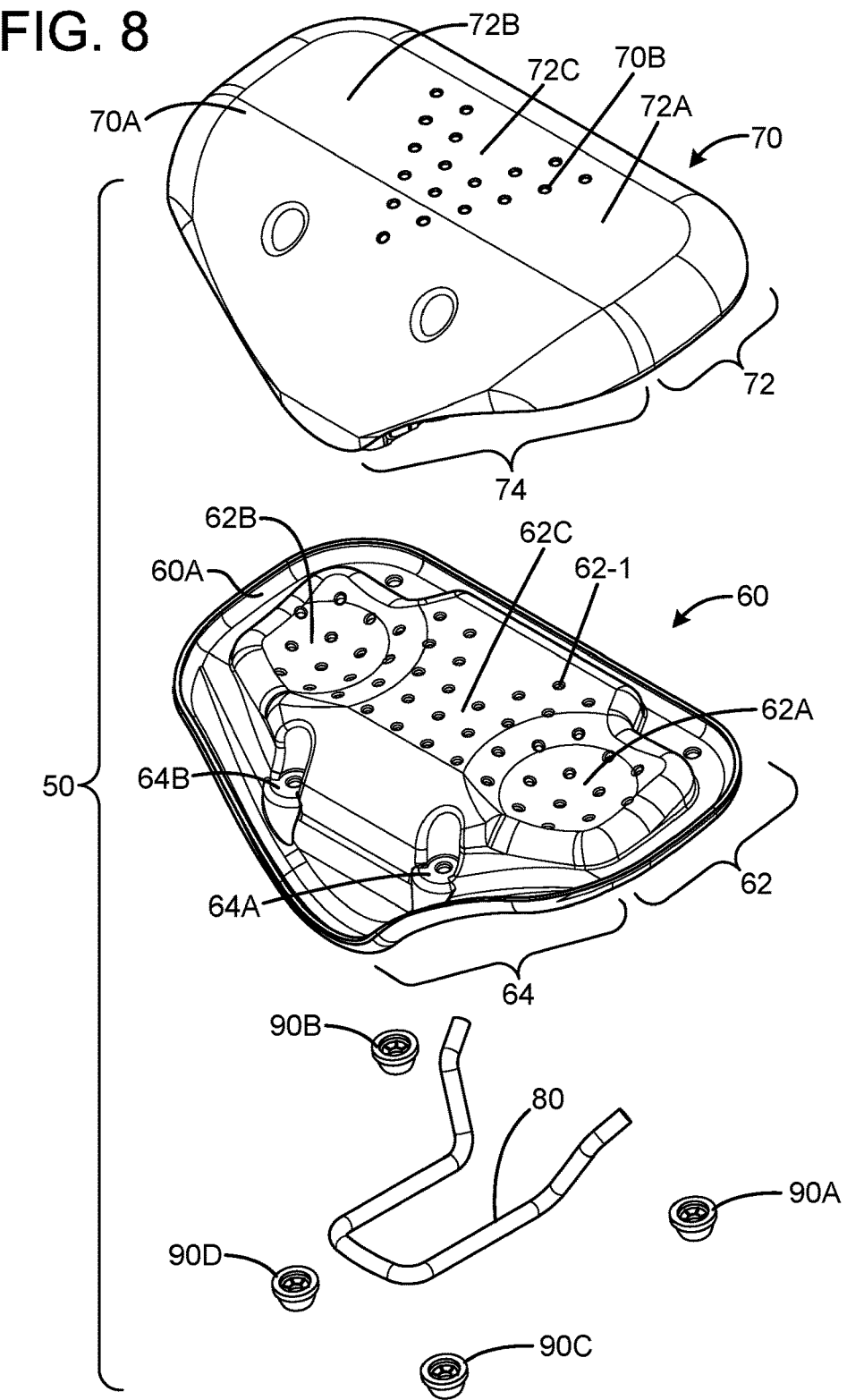
FIG. 8 is an exploded isometric view of another embodiment of a seat structure in accordance with aspects of the invention, taken above and to the right of the seat structure.
Figure 9:
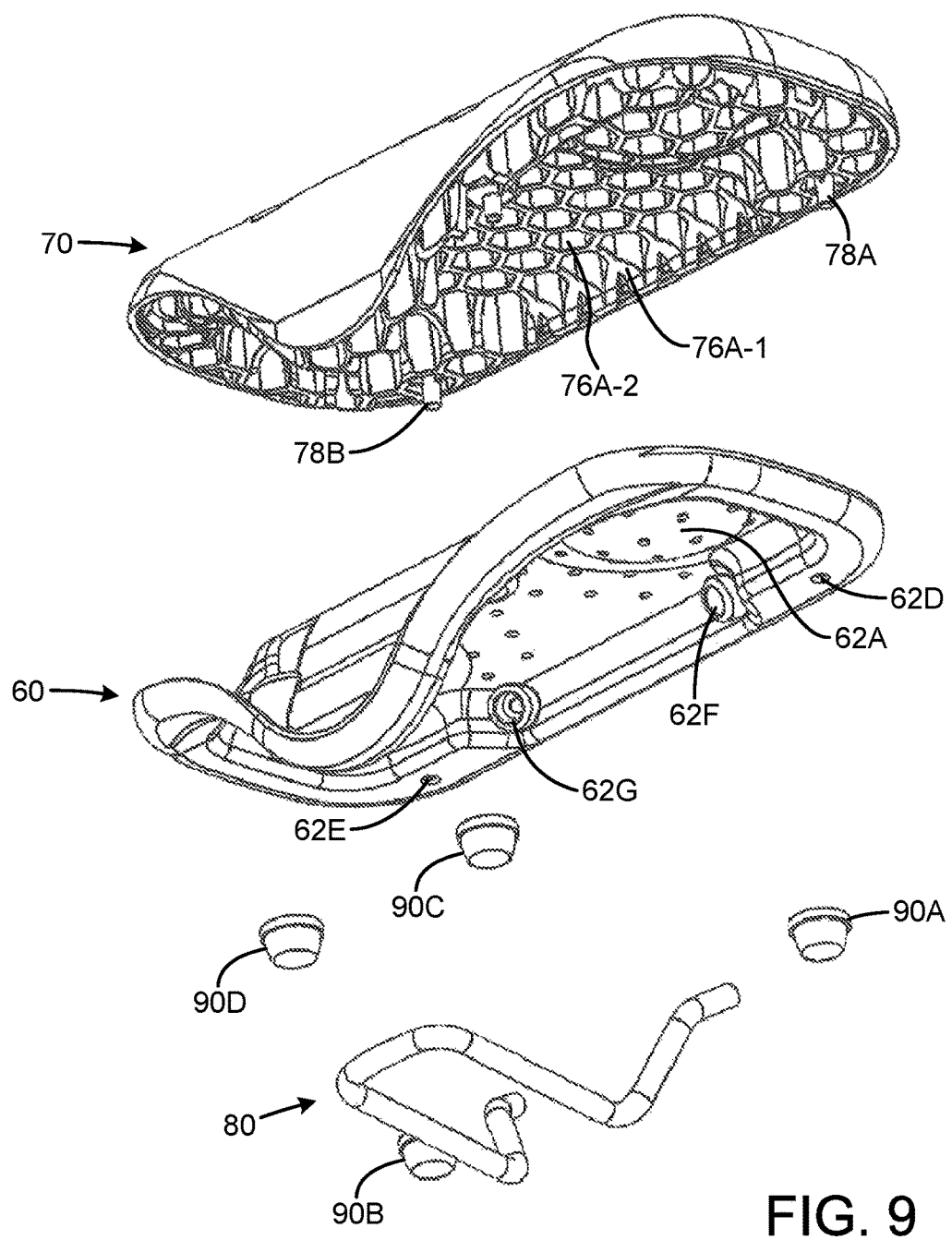
FIG. 9 is another exploded isometric view of the seat structure of FIG. 8, taken below and to the right of the seat structure.

The seat structure 50 further defines a forwardly-positioned, downwardly slanted or sloping nose portion 54. A distinguishing characteristic of the nose portion and the seat structure is that it is bump-less, i.e. there is no raised portion at the area at 58C between the user's legs which would extend upwardly from the laterally outward portions 58A, 58B. The nose portion 54 includes a tip portion 56 and tapers in width from the width of the support region to the tip 56A. The nose portion 54 defines a curved contour extending downwardly from the support region 52 to the nose tip region 56, as shown in FIG. 7.

The top cushion or pad 70 is made of material such as TPU, gel, silicone or foam, and is affixed on top of the substrate by affixing means, such as fasteners 90, adhesive or the like. The pad 70 may be removable or permanently attached to the substrate structure.

The rigid substrate 60 is attached to a rail structure 80 on the bottom. The rail structure may be made of rigid material such as a plastic, carbon fiber or metal. The rail structure 80 provides an attachment structure for attaching the seat structure to a seat bracket or seat post.

The pad's outer surface can be covered with a removable or permanently attached cover of similar design and made of various material or padding to provide a variety of individual choices for personalization or comfort as desired by the rider.

In an exemplary embodiment the seat structure has a lateral dimension W (FIG. 3) greater than its front-to-back dimension D (FIG. 6) and is wide enough to bridge the ischial tuberosities of the user. In an exemplary embodiment, W=9 inches, D=5.38 inches, and the height of the seat structure H=3.14 inches. The seat structure in the support region 52 has a thickness of about 1 inch in this embodiment. Of course, for other embodiments and applications, the dimensions may vary.

Turning now to FIGS. 8-15, an exemplary construction of the seat structure 50 is disclosed in further detail, and is particularly adapted for use in a bicycle or exercise bike. In this embodiment, the seat structure includes substrate 60, pad 70, and attachment structure 80 configured for attachment to a bracket or other mount for attaching the seat 50 to a seat post (not shown).

The substrate 60 is a rigid structure, which in this embodiment is formed by injection molding nylon or other suitable plastic material. Alternatively, the substrate structure may be fabricated from a metal or carbon fiber, or other suitable rigid material. The substrate structure 60 includes laterally extending area 62 underlaying the area 52, and a generally tapered, downwardly extending portion 64. In this exemplary embodiment, the area 62 is perforated with ventilation holes 62-1, and includes center, generally planar, portion 62C between depressions 62A and 62B. The depressions 62A, 62B underlay the areas 52A, 52B of the seat structure. In an exemplary embodiment, the depressions have a generally circular peripheral configuration, with a diameter of 4⅜ inches, and are spaced apart, center-to-center, by 5 inches. The area 62 in this exemplary embodiment has a width of 8.75 inches and a depth of 3.25 inches. The substrate portion 62 includes a pair of openings configured to receive post fastener portions extending from the back of the pad 70.

In this exemplary embodiment, the portion 64 of substrate 60 is generally solid, i.e. unperforated, except for a pair of openings 64A, 64B arranged to receive post fastener portions extending from the pad 70. In other embodiments, the portion 64 may be perforated. The portion 64 is curved downwardly from portion 62 at a curvature of 2.38 inches, in this exemplary embodiment The substrate portion 60 in this exemplary embodiment includes a peripheral wall 60A. The underside of the substrate portion 62 defines a receptacle 64D for receiving center portion 80A of the attachment structure 80, and receptacles 62F, 62G at the back of the substrate to receive the ends of the attachment structure 80.

The pad 70 is an injection-molded structure, which generally defines rearward, generally flat region 72 and a curved, tapered and downwardly extending front portion 74. The pad may be fabricated of a deformable material, such as a urethane, a closed cell foam, gel or silicone. The pad has a pattern of ventilation through holes 70B defined therein, predominately in the rear portion 72. The pad includes a top surface 70A.

Figure 12:
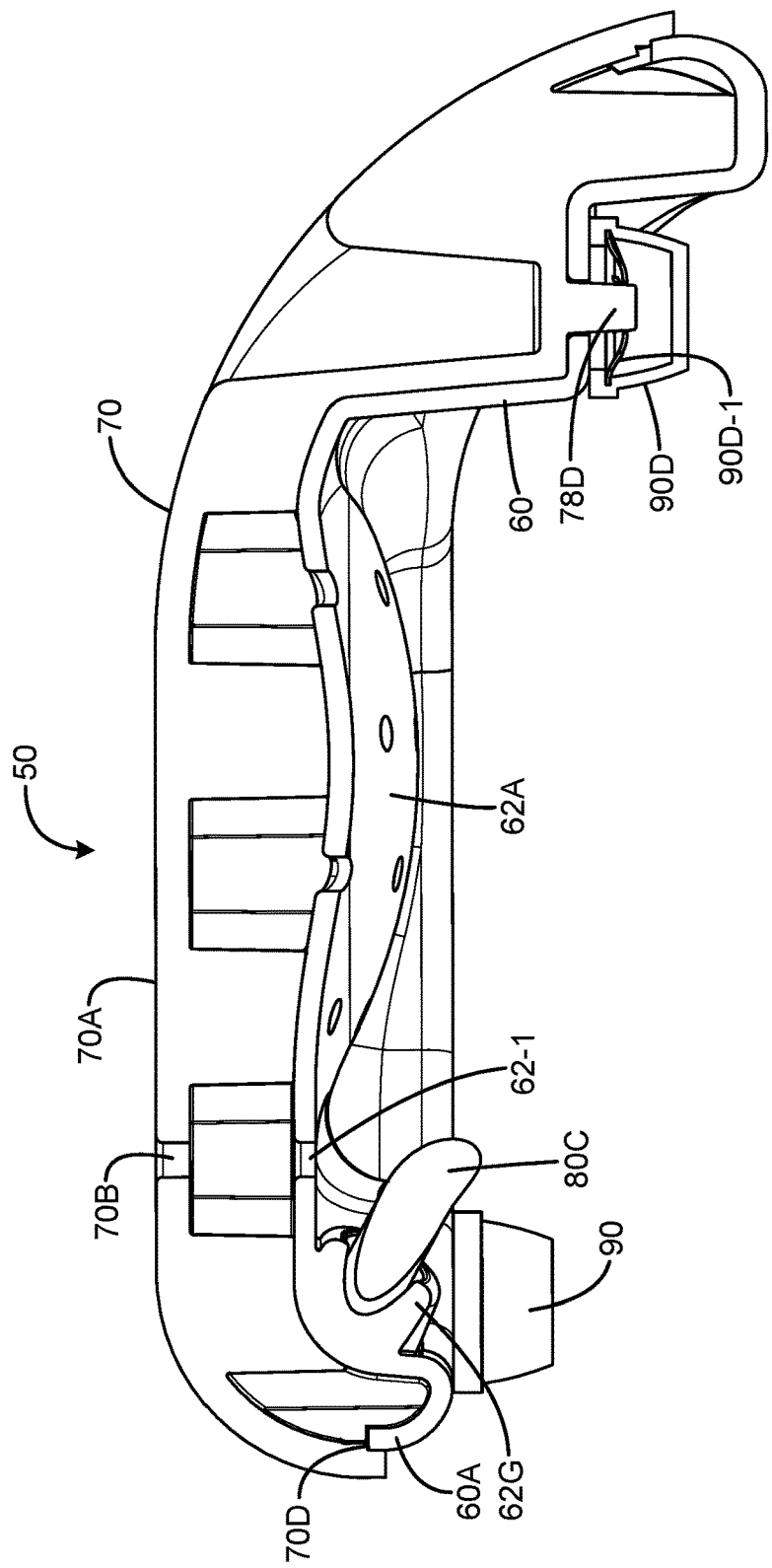
FIGS. 12 and 13 are longitudinal cutaway views of the seat structure of FIG. 8.

The back side 76 of the pad is a honeycomb structure 76A defined by walls 76A-1 and open cells 76A-2. The pad 70 has a thickness in area 72C which will overlay area 62C of the substrate structure of 0.5 inches, and in area 72C the cells have a depth of 0.375 inches with the cells about 0.5 inches wide. In areas 72A and 72B, the cells have a depth of 0.75 inches so as to fill the depressions 62A, 62B of the substrate structure. The increased depth of the honeycomb structure in these areas provides the areas of increased softness or resilience, to accommodate the user's sit bones more comfortably. FIG. 12 illustrates differences in depth of the cells. Of course, the dimensions may vary for different embodiments and applications.

The pad 70 has a peripheral indented shoulder portion 70D which is configured to receive the top edge of the substrate peripheral wall 60A, so that the top edge is covered by the pad.

The bottom surface of the pad 70 also defines downwardly protruding post portions 78A-D, which are positioned to extend through the holes 62D, 62E and 64A, 64B respectively in the substrate portion. Fasteners 90A-90D (FIG. 9) are pressed onto the post portions to capture the tips of the post portions. The fasteners 90 in this exemplary embodiment include an interior gripper 90D-1 (FIG. 12) which receives the post portion and resists disengagement of the post after engagement.

Figure 10:
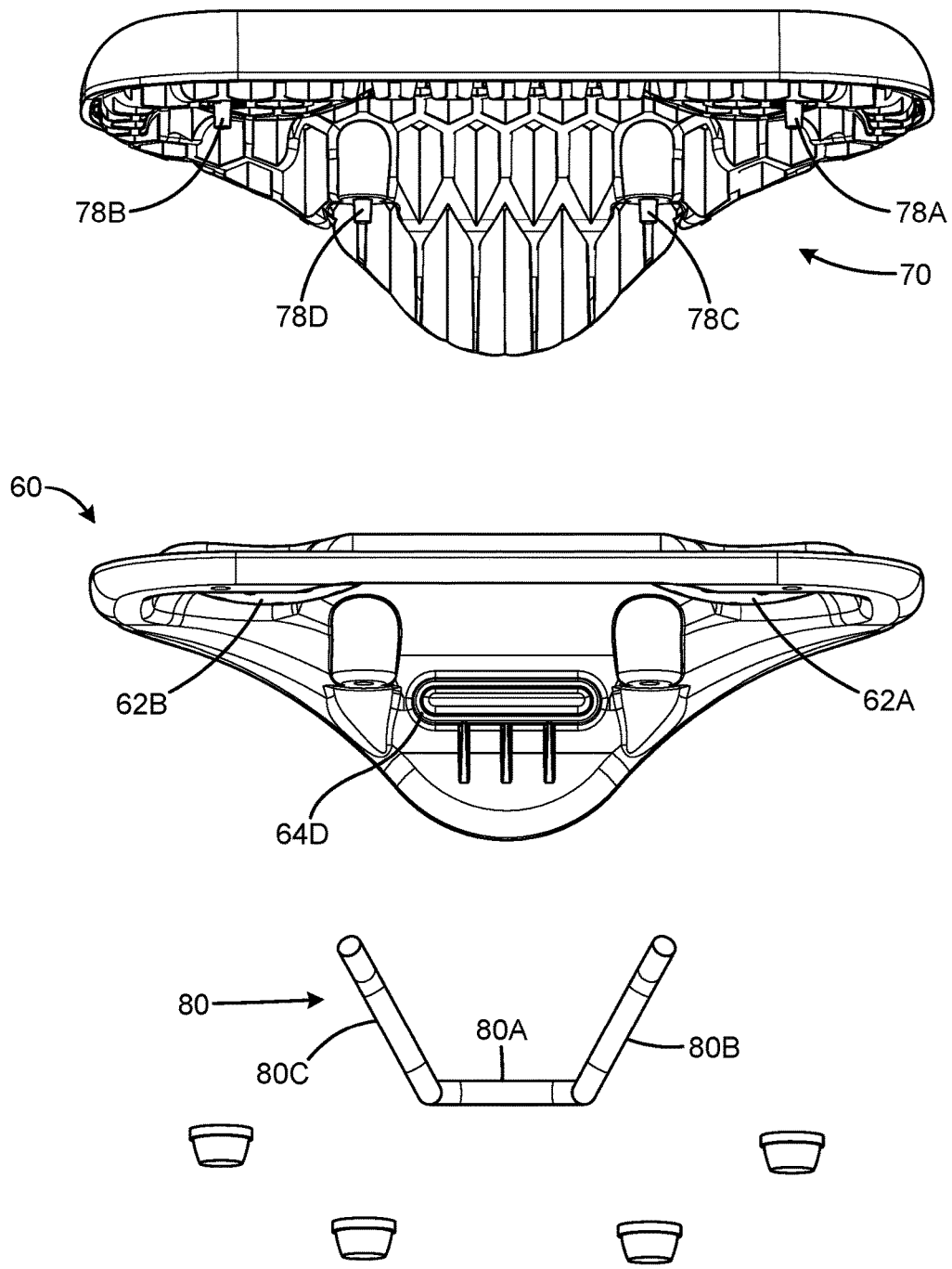
FIG. 10 is an exploded rear isometric view of the seat structure of FIG. 8.
Figure 11:
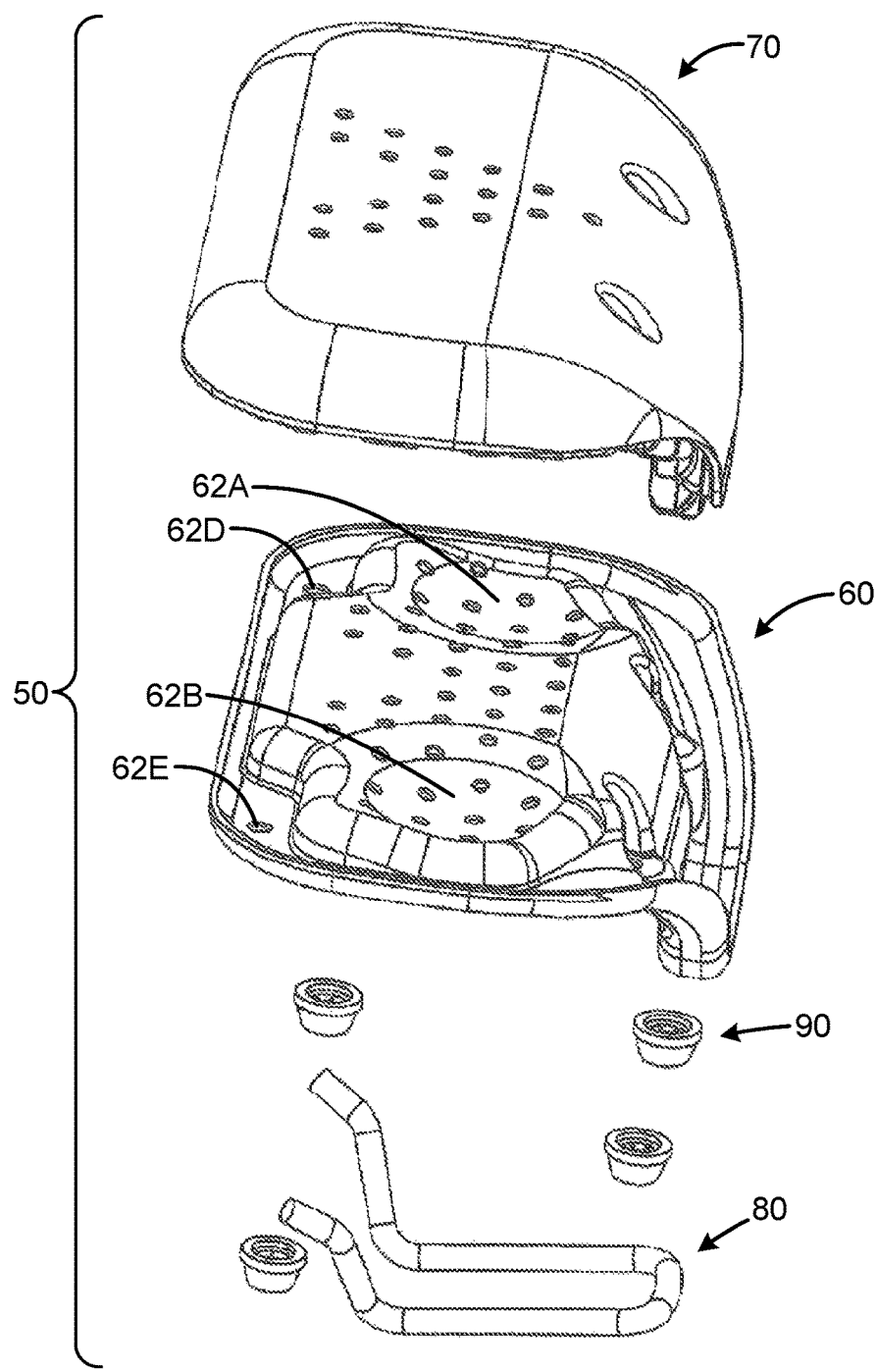
FIG. 11 is another exploded isometric view of the seat structure of FIG. 8, taken from above and to the left of the seat structure.

The attachment structure 80 in this exemplary embodiment is a wire or metal rail structure, bent into a sort of U-shape, with the closed end 80A configured to fit into receptacle 64D of the nose portion of the substrate structure (FIG. 10). The ends of the leg sections or rail sections 80B and 80C of the structure 80 are maneuvered into the receptacles 62F, 62G of the substrate by manipulating the rod structure.

Figure 13:
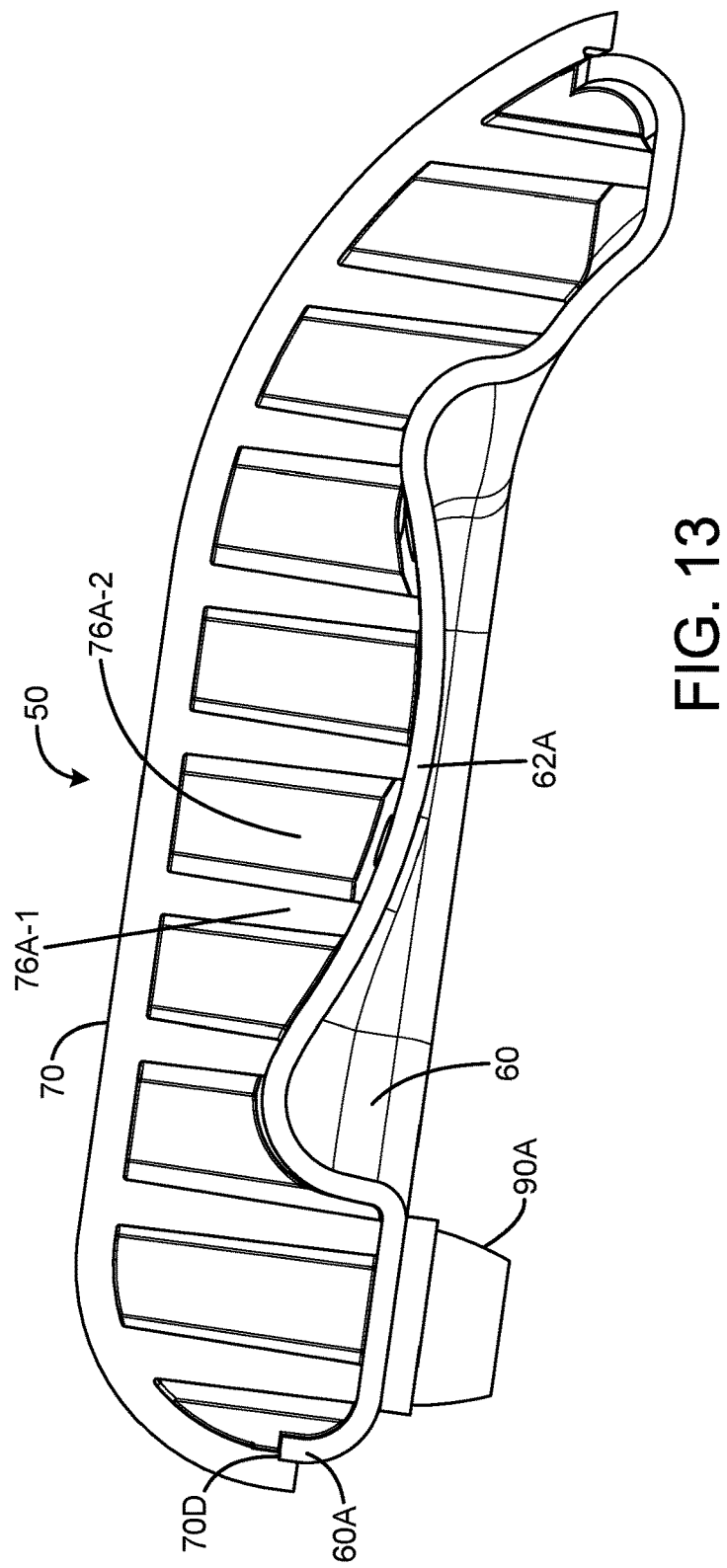
Figure 14:
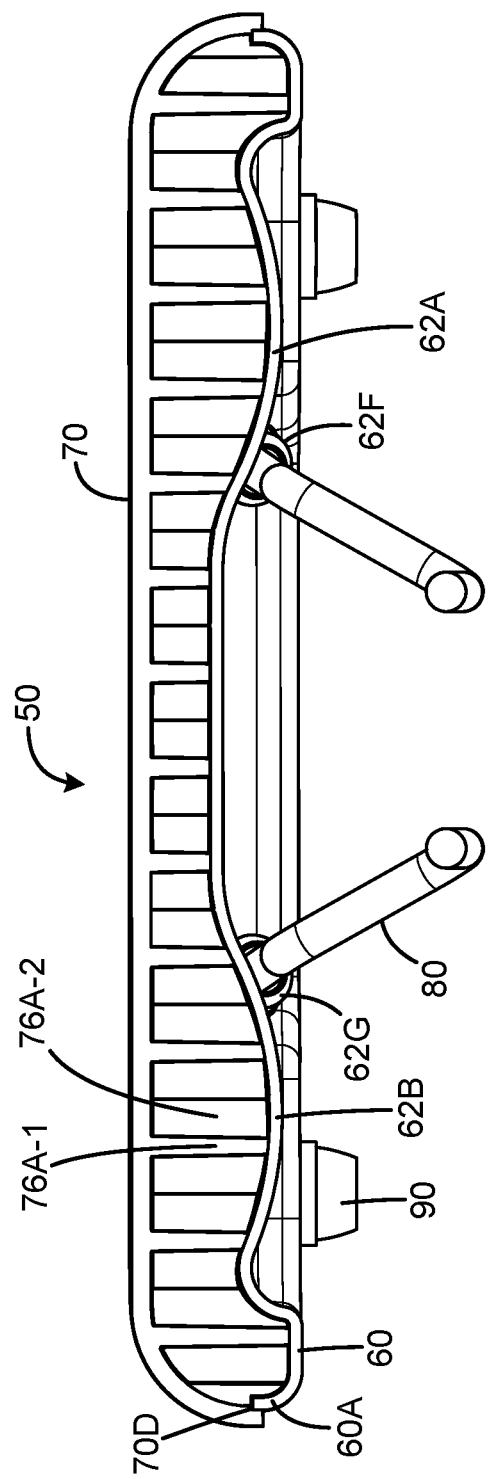
FIG. 14 is a lateral cutaway view of the seat structure of FIG. 8.
Figure 15:
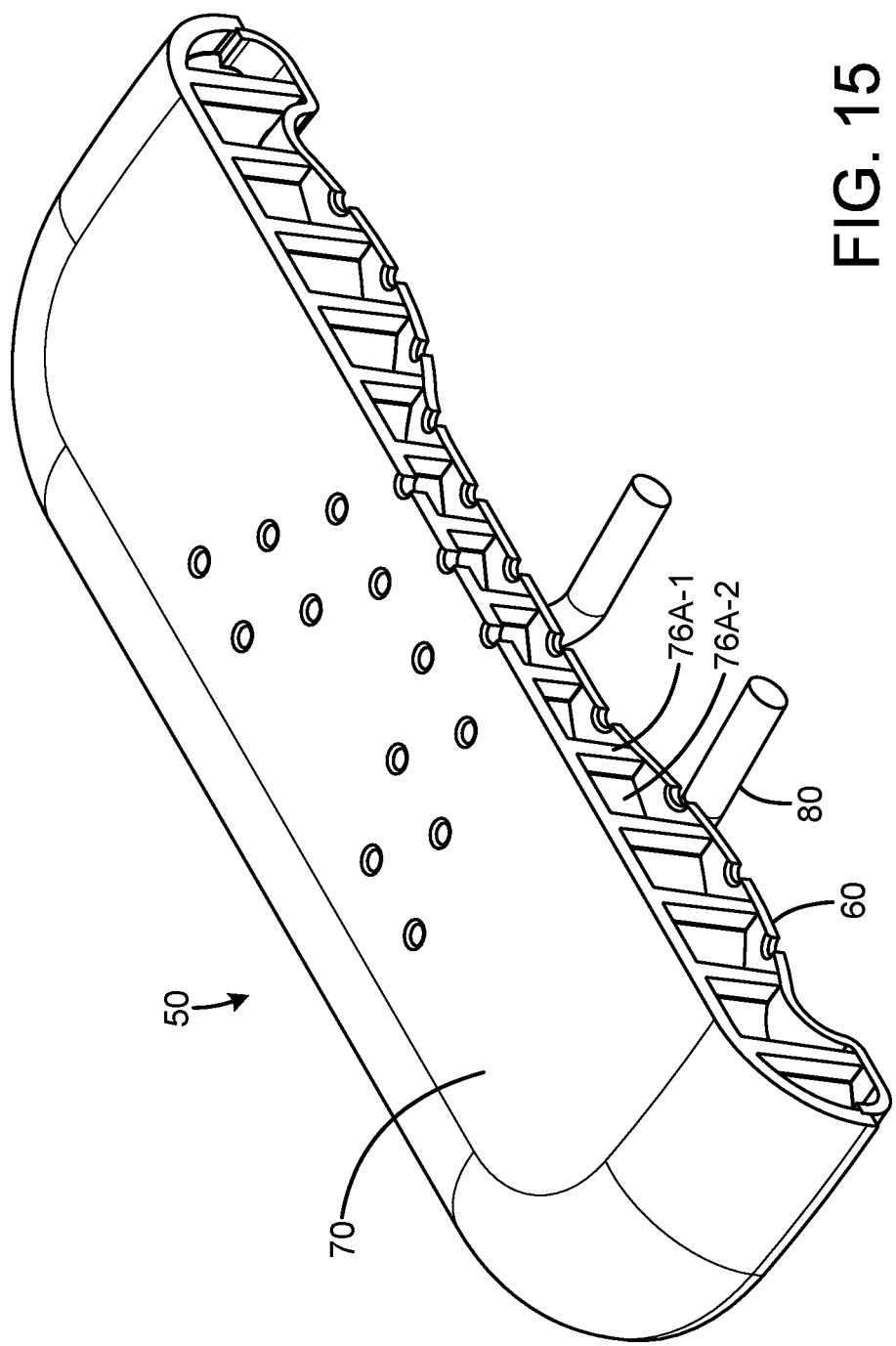
FIG. 15 is a lateral cutaway isometric view of the seat structure of FIG. 8, taken above and to the left of the seat structure.

FIGS. 12-15 illustrate the seat construction and honeycomb structure in further detail. FIG. 12 is a longitudinal cutaway view taken through the seat structure through nut 90D and post 78D. FIG. 13 is a longitudinal cutaway view taken intermediate the areas 52A, 52B. FIG. 14 is a lateral cutaway view taken through the areas 52A, 52B. FIG. 15 is an isometric lateral cutaway view taken forward of the view of FIG. 14.

In another embodiment, the seat structure may provide a basic pad structure of essentially uniform density, e.g. by molding foam or other material. In this alternate embodiment, the substrate would typically provide the depressions underlying the sit bones.

In a further alternate embodiment, the pad may be custom molded to a specific user's shape, to form a custom seat. The substrate in this embodiment need not provide the sit bone depressions as in the foregoing embodiment. The pad would be much thinner than the pad described above with respect to FIGS. 8-15. The pad in this alternate embodiment may be formed from a carbon fiber, pre-impregnated with a moisture-cured resin, although other materials may alternatively be employed. The pad is formed to conform to a substrate, and the substrate will be pre-installed on a bicycle. The pre-impregnated carbon fiber pad is stored in a moisture-free bag. When removed from the bag, it is placed on the substrate, and the user mounts and sits the seat for a period of time sufficient for the pad to conform to the user's derriere and the resin to cure to a hardened state. The pad will not have areas of different densities in this example. The length of time may be 20 to 30 minutes but will depend on the resin and the environmental moisture content. The resultant pad can be substantially thinner than the pad for the embodiment of FIGS. 8-15, e.g. on the order of ¼ inch. This custom seat may be ultra-lightweight.

In yet another alternate embodiment, the areas 52A, 52B of reduced density may be provided by separate pieces of pad material which fit into openings in the pad at areas 52A, 52B. The separate pieces could be of different color. The separate pieces may be softer than the rest of the pad structure to cushion the sit bones. The separate pieces would have the configuration of the dashed lines shown in FIG. 1 as 52A, 52B. The pad may be marketed as a kit with a plurality of sets of pieces of different densities to allow the user to select the most comfortable set. The separated pieces may be easily removable from the pad, being held in place by an interference fit and possible double-sided tape if necessary.

In a further embodiment, the material of the pad structure conforms to the contours of the user's buttocks and reverts to the original shape after each use. TPU is one example of a material suitable for this purpose.

In another embodiment, the pad structure may be removable from the frame or substrate structure. This could be particularly useful for the custom seat embodiment.

Although the foregoing has been a description and illustration of specific embodiments of the subject matter, various modifications and changes thereto can be made by persons skilled in the art without departing from the scope and spirit of the invention.

What is claimed is:

1. A seat structure, comprising
   a substrate structure;
   a pad structure affixed to a top surface of the substrate structure;
   and wherein the substrate structure and the pad structure are integrated such that the seat structure has a support region configured to provide a support for a user's buttocks, and the pad structure comprises a top pad surface that defines a downwardly sloped nose portion sloping downwardly and to the front; and wherein the top pad surface is bump-less in that there is no raised portion which extends upwardly from adjacent laterally outward portions of the top pad surface;
   wherein:
   the pad structure includes a plurality of downwardly extending post portions;
   the substrate structure includes a downwardly sloped nose portion extending downwardly and forwardly beyond a remainder of the substrate structure and having an upturned lip along a front edge of the substrate structure;
   the substrate structure includes a corresponding plurality of openings, at least some of which are disposed in the downwardly sloped nose portion of the substrate structure rearward of the upturned lip;
   and wherein the post portions extend through the openings and are captured by fasteners to secure the pad structure to the substrate structure.

2. The seat structure of claim 1, wherein the substrate structure includes a peripheral wall including the upturned lip having a top edge, and the pad structure includes a peripheral indented shoulder portion configured to receive the top edge of the peripheral wall, so that the top edge is covered by the pad.

3. The seat structure of claim 1, wherein the pad structure has a uniform density.

4. The seat structure of claim 1, wherein:
   the seat structure has a lateral dimension greater than a front-to-back dimension.

5. The seat structure of claim 1, wherein the support region includes two areas having different densities than other parts of the seat structure.

6. The seat structure of claim 5, wherein the two areas are softer than adjacent areas of the seat structure to cushion a user's ischial tuberosities.

7. The seat structure of claim 1, wherein the substrate structure defines first and second depressions underlaying the two areas of the pad structure, and the pad structure has an increased thickness at the two areas.

8. The seat structure of claim 1, wherein the pad structure comprises a deformable material having a top pad surface and a back-side honeycomb structure defined by walls and open cells.

9. The seat structure of claim 1, wherein the pad structure is fabricated of a material comprising at least one of a thermo-plastic urethane, a gel, a carbon fiber pad pre-impregnated with moisture-curable resin, or foam.

10. The seat structure of claim 1, wherein the substrate structure is fabricated from a material comprising at least one of a nylon, a plastic, a metal, urethane or carbon fiber.

11. The seat structure of claim 1, further comprising an attachment structure configured for attaching the seat structure to another device.

12. The seat structure of claim 11, wherein the attachment structure comprises a rail structure attached to the substrate structure, the rail structure comprising a generally U-shaped rod with a closed end and opposed first and second leg portions, and wherein the closed end of the rod is configured to fit into a receptacle in the nose portion of the substrate structure, and ends of the first and second leg portions are configured to fit into leg receptacles defined in the substrate structure underlying the support region.

13. A seat structure, comprising
    a substrate structure;

a resilient pad structure affixed to a top surface of the substrate structure;

wherein the substrate structure and the resilient pad structure are integrated such that the seat structure has a support region configured to provide a support for a user's buttocks, and the resilient pad structure comprises a top pad surface that defines a downwardly sloped nose portion sloping downwardly and to the front;

the top pad surface is bump-less in that there is no raised portion which extends upwardly from adjacent laterally outward portions of the top pad surface;

wherein the support region includes two areas having different densities than other parts of the seat structure, the two areas defined by separate pieces of pad material which fit into openings formed in the pad structure; and the two areas are softer than adjacent areas of the seat structure to cushion the ischial tuberosities;

wherein:

the pad structure includes a plurality of downwardly extending post portions;

the substrate structure includes a downwardly sloped nose portion extending downwardly and forwardly beyond a remainder of the substrate structure and having an upturned lip along a front edge of the substrate structure;

the substrate structure includes a corresponding plurality of openings, at least some of which are disposed in the downwardly sloped nose portion of the substrate structure rearward of the upturned lip;

and wherein the post portions extend through the openings and are captured by fasteners to secure the pad structure to the substrate structure.

14. The seat structure of claim 13, wherein the separate pieces of pad material are removable from the pad structure, and are held in place at least partially by interference fit.

15. The seat structure of claim 14, further comprising an attachment structure configured for attaching the seat structure to another device.

16. The seat structure of claim 14, wherein the pad structure comprises a deformable material having a backside honeycomb structure defined by walls and open cells.

* * * * *